(12) United States Patent
Shurhay et al.

(10) Patent No.: US 12,158,628 B2
(45) Date of Patent: Dec. 3, 2024

(54) MULTI-WORK AREA FIBER MODULE

(71) Applicant: Panduit Corp., Tinley Park, IL (US)

(72) Inventors: Mark Shurhay, Western Springs, IL (US); Bon B. Sledzinski, Westmont, IL (US); Jerry A. Wiltjer, Frankfort, IL (US)

(73) Assignee: Panduit Corp., Tinley Park, IL (US)

( * ) Notice: Subject to any disclaimer, the term of this patent is extended or adjusted under 35 U.S.C. 154(b) by 130 days.

(21) Appl. No.: 17/976,078

(22) Filed: Oct. 28, 2022

(65) Prior Publication Data

US 2024/0142736 A1    May 2, 2024

(51) Int. Cl.
*G02B 6/44* (2006.01)

(52) U.S. Cl.
CPC ......... *G02B 6/4454* (2013.01); *G02B 6/4441* (2013.01); *G02B 6/4445* (2013.01); *G02B 6/4446* (2013.01); *G02B 6/4447* (2013.01)

(58) Field of Classification Search
CPC .. G02B 6/4441; G02B 6/4445; G02B 6/4446; G02B 6/4447; G02B 6/4454
See application file for complete search history.

(56) References Cited

U.S. PATENT DOCUMENTS

| | | | |
|---|---|---|---|
| 5,412,751 A | 5/1995 | Siemon et al. | |
| 5,778,132 A | 7/1998 | Csipkes et al. | |
| 5,947,765 A | 9/1999 | Carlson, Jr. et al. | |
| 7,970,249 B2 | 6/2011 | Solheid et al. | |
| 8,385,711 B2 | 2/2013 | Fabrykowski et al. | |
| 8,488,934 B2 * | 7/2013 | Zhou | G02B 6/4454 385/139 |
| 8,660,397 B2 | 2/2014 | Giraud et al. | |
| 9,116,324 B2 * | 8/2015 | Cooke | G02B 6/4452 |
| 9,383,535 B2 * | 7/2016 | Abbiati | G02B 6/4441 |
| 9,383,538 B2 | 7/2016 | Giraud et al. | |
| 10,048,460 B2 | 8/2018 | Courchaine et al. | |
| 10,082,635 B2 * | 9/2018 | Feng | G02B 6/4452 |
| 10,114,187 B2 | 10/2018 | Allen | |
| 10,514,518 B1 * | 12/2019 | Livingston | G02B 6/4452 |
| 10,788,640 B2 | 9/2020 | Smith et al. | |
| 10,852,501 B2 | 12/2020 | Livingston et al. | |
| 2010/0329624 A1 | 12/2010 | Zhou et al. | |
| 2018/0095232 A1 | 4/2018 | Feng et al. | |
| 2020/0310061 A1 | 10/2020 | Livingston et al. | |

(Continued)

FOREIGN PATENT DOCUMENTS

| | | |
|---|---|---|
| CN | 104216082 A | 12/2014 |
| CN | 107807426 A | 3/2018 |

(Continued)

*Primary Examiner* — Ryan A Lepisto
(74) *Attorney, Agent, or Firm* — Peter S. Lee; Christopher S. Clancy; James H. Williams

(57) ABSTRACT

A fiber module is disclosed with an improved design that creates at least two work areas for managing fiber within the module body by including a work area floor that partitions the interior of the module to define at least two work areas. Each of the work areas includes their own fiber management equipment, as well as fiber routing elements for managing a length of slack fiber within each of the work areas. By segmenting the interior of the module into the multiple work spaces, the module described herein is more efficient when managing larger numbers of fibers.

17 Claims, 11 Drawing Sheets

(56) References Cited

U.S. PATENT DOCUMENTS

2022/0196954 A1   6/2022  Chen et al.
2022/0196959 A1   6/2022  Cams et al.
2022/0299726 A1*  9/2022  Li ........................ G02B 6/4454

FOREIGN PATENT DOCUMENTS

| EP | 2383596 A1 | 11/2011 |
|----|------------|---------|
| EP | 2788808 B1 | 4/2015 |
| EP | 2929387 A1 | 10/2015 |
| EP | 4011078 A1 | 6/2022 |
| WO | 1991005281 A1 | 4/1991 |
| WO | 2019091123 A1 | 5/2019 |
| WO | 2021026879 A1 | 2/2021 |

\* cited by examiner

MULTI-WORK AREA FIBER MODULE

FIELD OF TECHNOLOGY

This disclosure relates to a fiber module with an improved structural design that creates at least two work areas for managing and/or splicing fiber within fiber module body. Each of the work areas may include its own one or more splice management equipment (e.g., splice holder).

BACKGROUND

Field splicing of fiber optic connectors is a common practice in the fiber installation industry. This type of splicing usually requires extra fiber (i.e., slack fiber) for the installer to utilize in the fusing process. This slack may be present in both the internal and outgoing fiber. The length of this slack can vary, but 18 inches is not uncommon. Once the fibers are spliced together, they may be protected by a heat shrink sleeve placed around the spliced area. This sleeve protects the delicate splice section from damage. These sleeves are typically held in place by a splice holder, where the splice holder secures the delicate connection to the cassette body.

The ability to manage the slack fiber and spliced sleeves in a protective enclosure (e.g., cassette) offers more installation options and convenience for the installer. As the data needs of customers increase, so too does the need to add more fiber capacity in a fiber installation system.

SUMMARY

This disclosure relates to a fiber module with an improved design that creates at least two work areas for splicing fiber within the fiber module body. The two work areas are created by including a work area floor that partitions the interior of the module to define at least two work areas, similar to creating two levels within the interior of the fiber module body. Each of the work areas may include a splice management equipment (e.g., splice holder).

According to an embodiment, a fiber module is disclosed. The fiber module comprising a module body comprising a first side wall; a second side wall; a rear wall including a rear opening, the rear opening including an upper route and a lower route; a top cover; a bottom cover; and a front face plate comprising a plurality of adapter openings, the plurality of adapter openings being arranged in at least a first row and a second row; and a work floor extending between the first side wall to the second side wall, the work floor defining, at least in part, bounds of a first work area and a second work area within an interior of the module body.

According to another embodiment a fiber module is disclosed. The fiber module comprising a module body comprising: a first side wall; a second side wall; a rear wall including a first rear opening and a second rear opening; a top cover; a bottom cover; and a front face plate comprising a plurality of adapter openings, the plurality of adapter openings being arranged in at least a first row and a second row; and a work floor extending between the first side wall to the second side wall, the work floor defining, at least in part, bounds of a first work area and a second work area within an interior of the module body.

DETAILED DESCRIPTION

This disclosure describes one or more embodiments of a fiber module (the "module") with an improved design that creates at least two work areas for managing fiber within the module body by including a work area floor that partitions the interior of the module to define at least two work areas. Each of the work areas may include a splice management equipment (e.g., splice holder), as well as fiber routing elements for managing a length of slack fiber within each of the work areas. By segmenting the interior of the module into the multiple work spaces, the module described herein is more efficient when managing larger numbers of fibers. The efficiency is achieved by providing an installer with a plurality of work areas to manage the excess lengths of slack fiber, while maintaining the overall fiber module footprint size to be the same, or similar, to existing fiber modules.

So the presently described module addresses the issues that may arise with managing more fiber splicing operations within a given module space by splitting the internal splicing work area within the same module into a plurality of distinct work areas. Although the following embodiments describe the module being partitioned into two distinct work spaces, additional partitions to create additional work spaces within the module are also within the scope of the module described herein.

Figure 1:
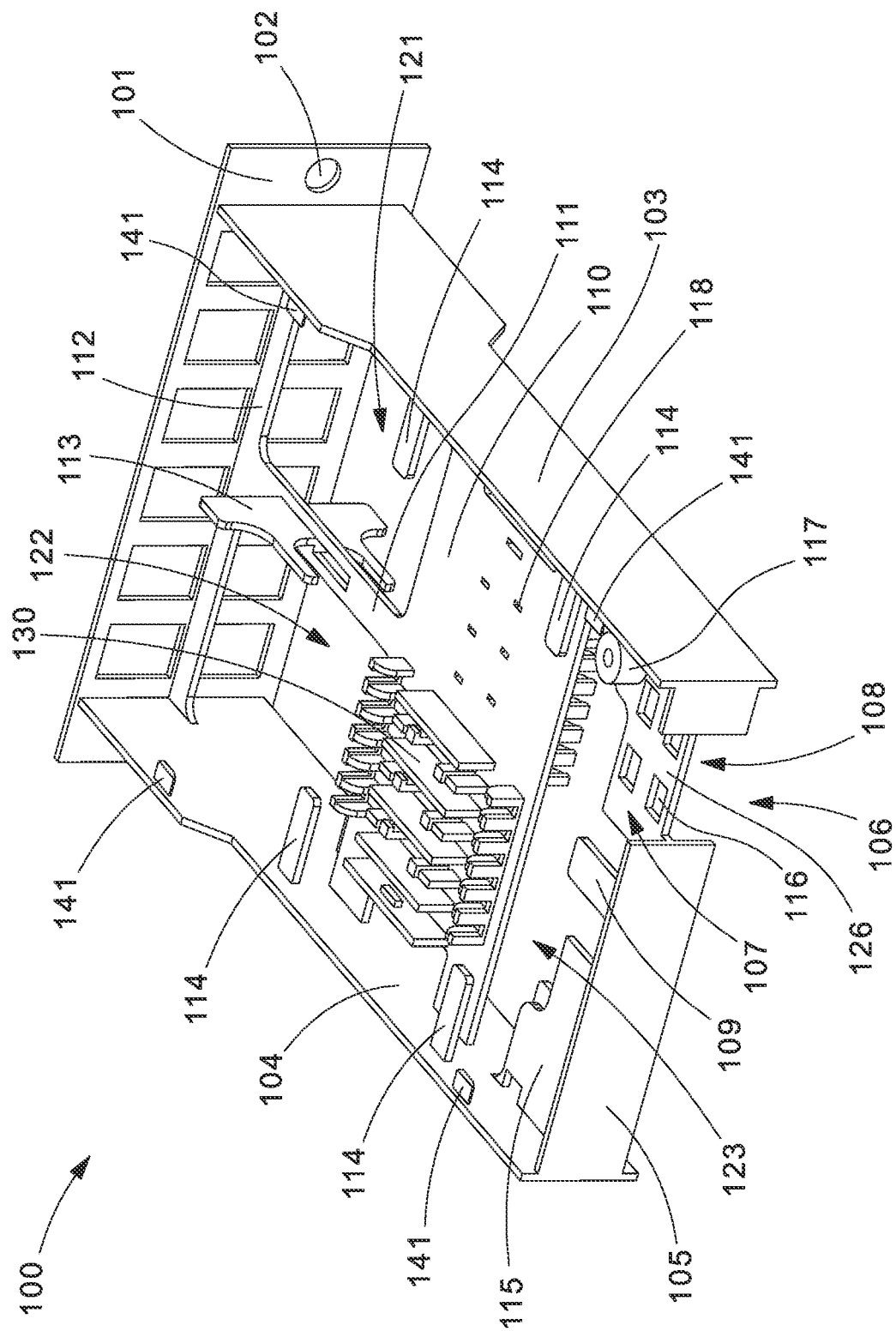
FIG. 1 is a perspective view of an exemplary multi-level fiber module, according to an embodiment.
Figure 8:
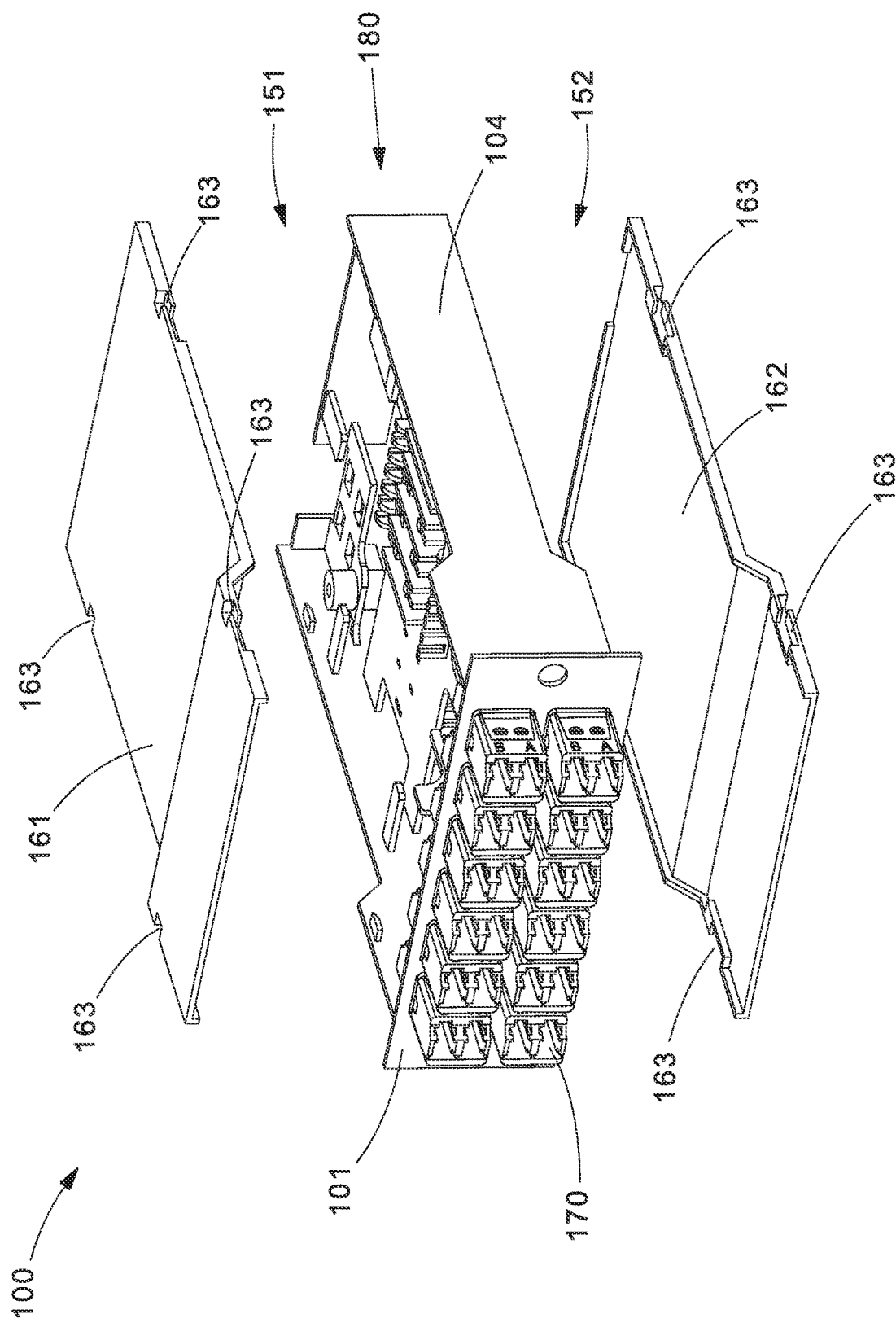
FIG. 8 is a perspective exploded view of the multi-level fiber module shown in FIG. 1, further including an upper cover and a lower cover.

FIG. 1 illustrates an exemplary module 100 (e.g., a fiber optic splice cassette) that includes a front face plate 101, a first side wall 103, a second side wall 104 positioned opposite the first side wall 103, and a rear wall 105 positioned opposite the front face plate 101. As shown in the exploded view of FIG. 8, the module 100 further includes a top cover 161 for covering an upper work area 151 and a bottom cover 162 for covering a lower work area 152. The top cover 161 includes a plurality of notches 163 so that to achieve an assembled state a corresponding tab 141 in the upper portion corresponding to the upper work area 151 of the side walls 103, 104 slide into the notch 163. Similarly, the bottom cover 162 includes a plurality of notches 163 so that a corresponding tab 141 in the lower portion corresponding to the lower work area 152 of the side walls 103, 104 slide into the notch 163 in the assembled state. Although not illustrated, a locking mechanism may be included for locking the top cover 161 and/or bottom cover 162 to their respective first side wall 103 or second side wall 104.

The front face plate 101, the first side wall 103, the second side wall 104, the rear wall 105, a top cover 161, and a bottom cover 162 comprise the bounds that form an interior of a module body 180 for the module 100. A work floor 110 inside the interior of the module body 180 is positioned such that the bounds of the upper work area 151 and the bounds of the lower work area 152 are defined in part by the work floor 110. For example, the bounds of the upper work area 151 are defined by the work floor 110, portions of the first side wall 103, portions of the second side wall 104, portions of the front face plate 101, portions of the rear wall 105, and the top cover 161. The bounds of the lower work area 152 are defined by the work floor 110, portions of the first side wall 103, portions of the second side wall 104, portions of the front face plate 101, portions of the rear wall 105, and the bottom cover 162.

The front face plate 101 includes a plurality of adapter openings 127 arranged into an upper row and a lower row. As shown in FIG. 4, the adapter openings 127 arranged in the upper row lead into the upper work area 151 (see e.g., FIG. 2) within the interior of the module body 180, and the adapter openings 127 arranged in the lower row lead into the lower work area 152 (see e.g., FIG. 3) within the interior of the module body 180. The front face plate 101 also includes openings 102 at opposite sides for receiving push pins, or other attachment components, to secure the front face plate 101 to a patch panel.

The rear wall 105 includes a single rear opening 106 for receiving one or more fibers, one or more cables, and/or other components. The rear opening 106 includes an upper route 107 for routing fibers into, or out of, the upper work area 151. The rear opening 106 further includes a lower route 108 for routing fibers into, or out of, the lower work area 152. The upper route 107 and the lower route 108 are defined by the tie-down floor 126, where the tie-down floor 126 is slightly recessed into the interior of the module 100 from the plane of the rear wall 105. The tie-down floor 126 includes a plurality of slot openings 116 that are spaced and configured so that cable ties may be routed through the slot openings 116 to tie-down fibers that are routed through the upper route 107 or the lower route 108. A retention boss 117 is also included near the upper route 107 and the lower route 108, where the retention boss 117 is utilized to further secure fibers that are entering or leaving the upper route 107 and the lower route 108. For example, the retention boss 117 may be a screw around which portions of an incoming cable may be wrapped around and secured, and where the screw may be rotated down to secure the portions of cable wrapped around it, and rotated up to release the portions of cable wrapped around it.

The work floor 110 is included within the inner housing of the module body 180 for partitioning it into the upper work area 151 and the lower work area 152 where fiber slack and splice connections may be separately managed. The work floor 110 may be positioned along the first side wall 103 and the second side wall 104 at a height line that is in the middle of the first side wall 103 and the second side wall 104. This way, the upper work area 151 and the lower work area 152 provide the same volume of space. According to other embodiments, the work floor 110 may be positioned along the first side wall 103 and the second side wall 104 at a height line that is offset from the middle of the first side wall 103 and the second side wall 104 to achieve different interior volumes for the upper work area 151 and the lower work area 152 (e.g., 90/10 split, 80/20 split, 70/30 split, 60/40 split, 40/60 split, 30/70 split, 20/80 split, 10/90 split, etc.). In addition to the work floor 110, additional components such as a bridge 111, a split floor 112, and a supplemental work floor 115 may be included within the interior housing of the module 100 to define the upper work area 151 and the lower work area 152.

Fibers that enter and reside within the upper work area 151 may be held in place using one or more of the side fiber hold-down tabs 114 that are present within the upper work area 151. Fibers that enter and reside within the lower work area 152 may be held in place using one or more of the side fiber hold-down tabs 119 that are present within the lower work area 152. The bridge 111 further supports the inclusion of a front fiber hold-down tab 113 that includes hold-down protrusions that extend into both the upper work area 151 and the lower work area 152. The front fiber hold-down tab 113 works to manage fiber being routed towards the front of the module 100 by holding down the fiber against a surface of the bridge 111. The rear wall 105 also supports a rear hold-down tab 109 that may be used to hold-down fibers within the upper work area 151 and along the rear wall 105, and the rear wall 105 also supports a rear hold-down tab 120 that may be used to hold-down fibers within the lower work area 152 and along the rear wall 105. In this way, lengths of excess slack fiber may be managed within the upper work area 151 and the lower work area 152. The split floor 112 helps define the top row of adapter openings 127 that leads into the upper work area 151 and the lower row of adapter openings 127 that leads into the lower work area 152 from inside the module body 180.

The module 100 further includes a splice holder 130 within the upper work area 151 for holding splice sleeves for fibers that are being managed within the upper work area 151. The splice holder 130 may be removably attached to the work floor 110 via protrusions on a bottom surface of the splice holder 130 fitting within a pattern of attachment slots 118 on the work floor 110. In other embodiments, the slots 118 may be holes in the work floor 110 that are created during the molding process for the work floor 110 to create splice sleeve retention barbs in the splice holder 130 when the splice holder 130 is made integral to be part of the work floor 110.

Figure 2:
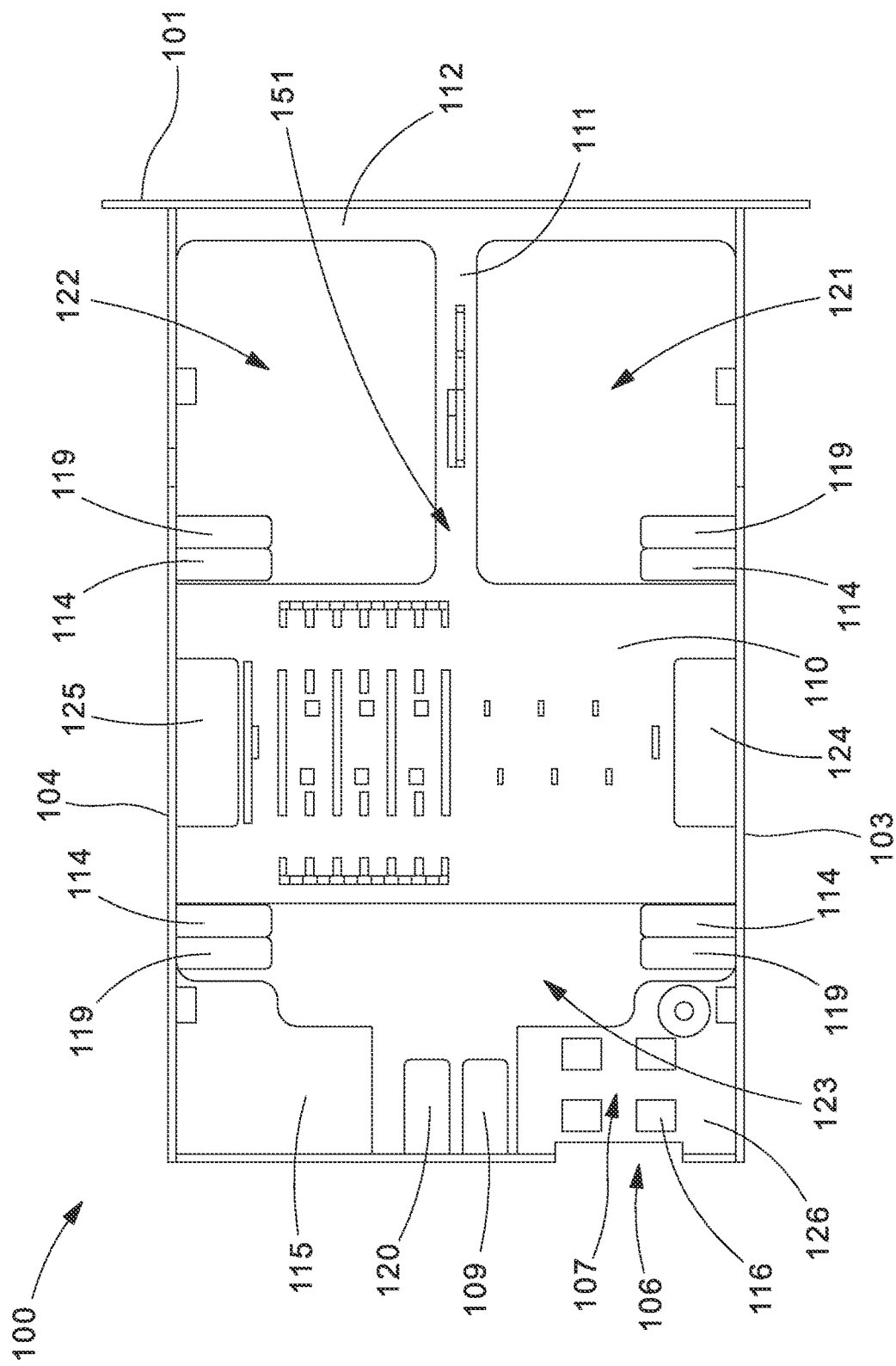
FIG. 2 is a top-down view looking down into a first work area of the multi-level fiber module shown in FIG. 1.

FIG. 2 shows a top-down view into the upper work area 151. In the upper work area 151, the splice holder 130 is shown to be aligned closer to the second side wall 104. Along the second side wall 104 is a passthrough opening 125 where fibers may pass between the upper work area 151 and the lower work area 152. For example, fibers in the upper work area 151 may pass down into the lower work area 152 through the passthrough opening 125, and/or fibers in the lower work area 152 may pass up into the upper work area 151 through the passthrough opening 125.

Figure 3:
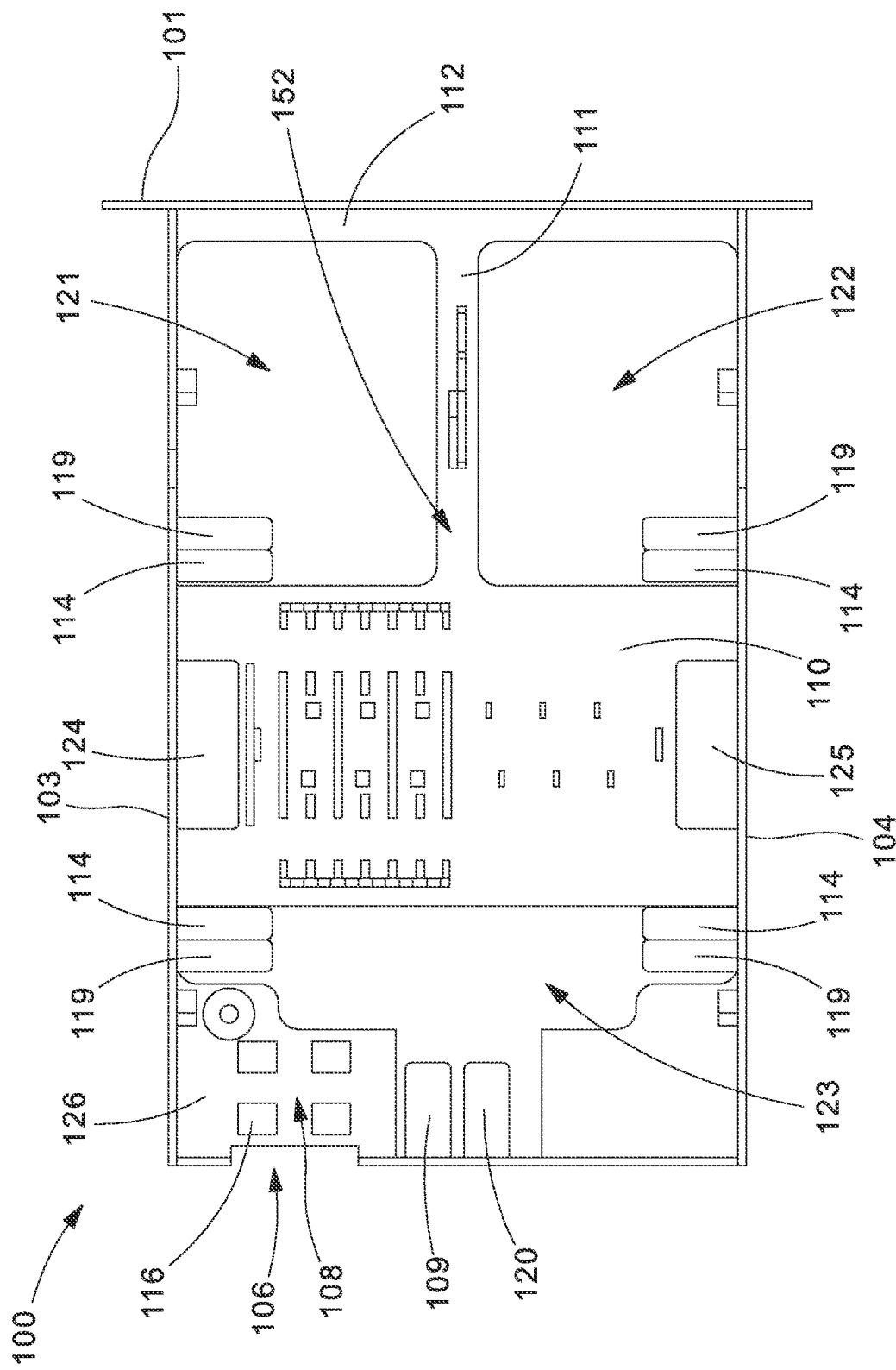
FIG. 3 is a top-down view looking down into a second work area of the multi-level fiber module shown in FIG. 1.
Figure 4:
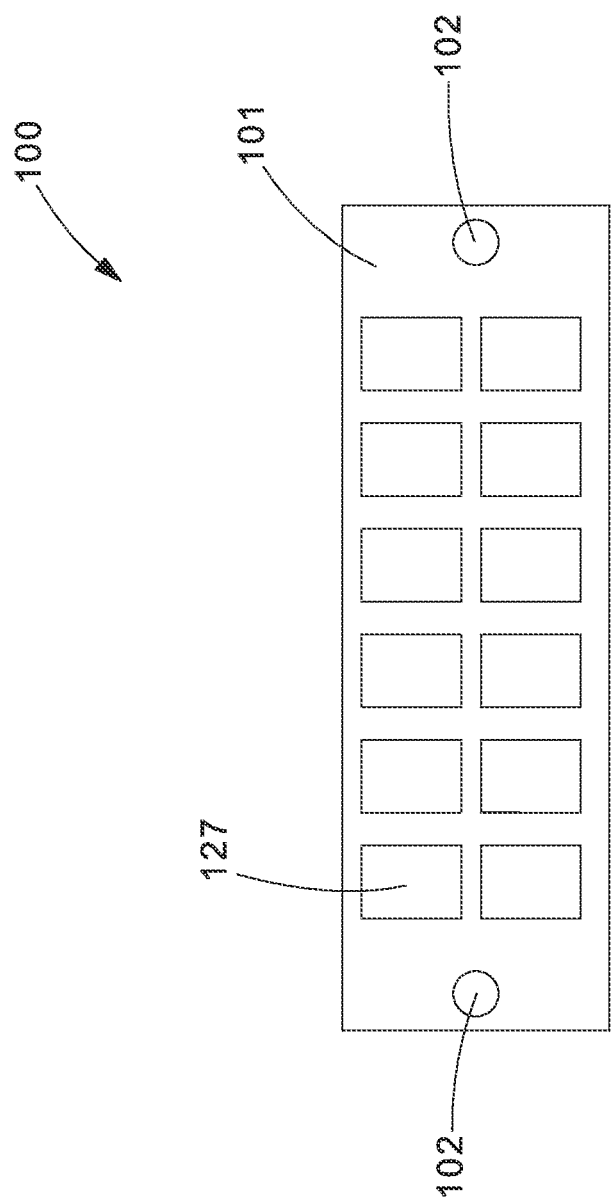
FIG. 4 is a front side view of the multi-level fiber module shown in FIG. 1.

FIG. 3 shows a top-down view into the lower work area 152. In the lower work area 152, the splice holder 130 is shown to be aligned closer to the first side wall 103. Along the first side wall 103 is a passthrough opening 124 where fibers may pass between the lower work area 152 and the upper work area 151. For example, fibers in the upper work area 151 may pass down into the lower work area 152, and/or fibers in the lower work area 152 may pass up into the upper work area 151.

Figure 9:
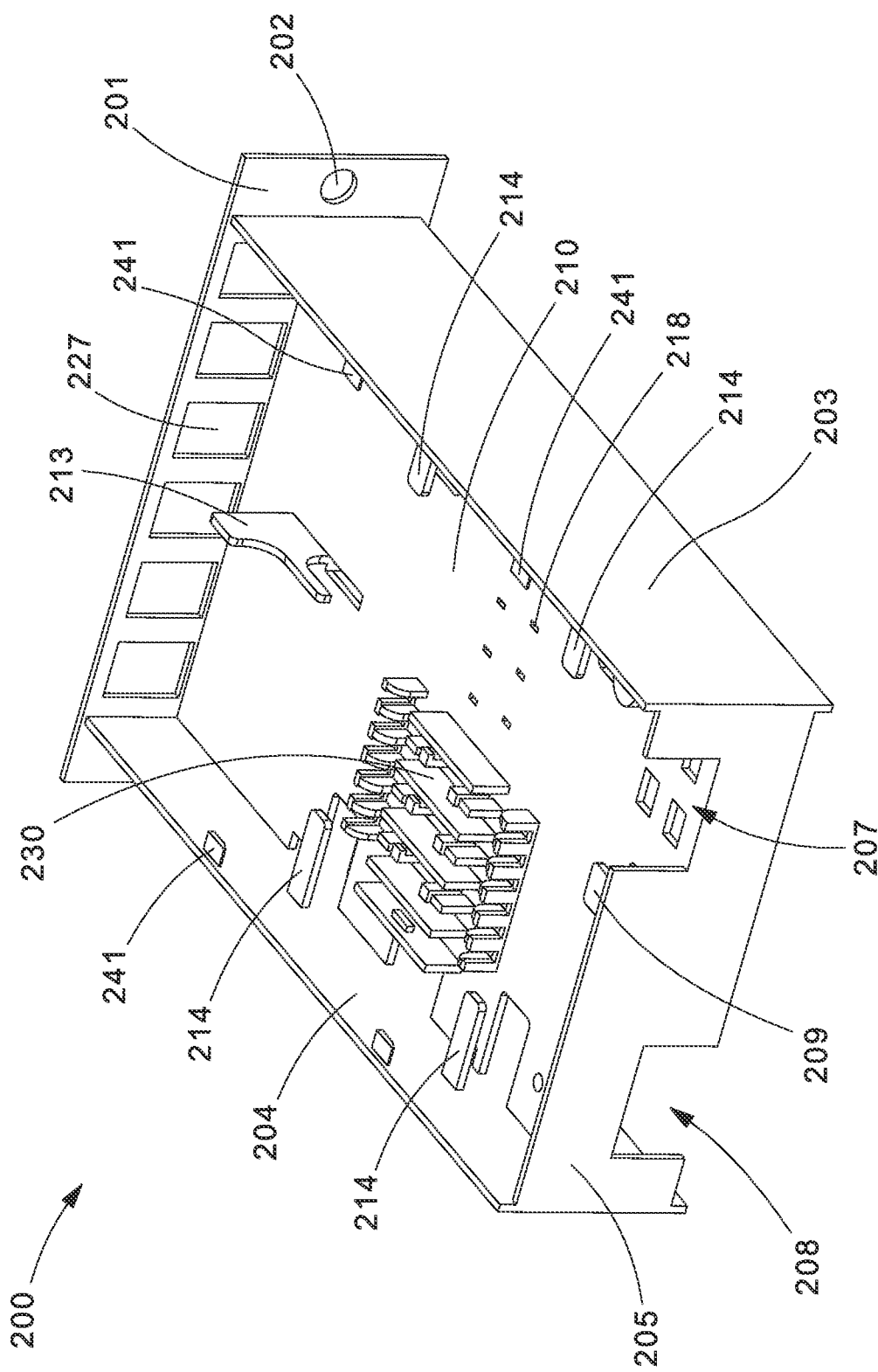
FIG. 9 is a perspective view of a multi-level fiber module, according to another embodiment.

In addition to the passthrough openings 124, 125, fibers may pass between the lower work area 152 and the upper work area 151 via any one or more of the floor openings 121, 122, 123 that are provided. According to the embodiment shown in FIG. 1, the floor openings 121, 122, 123 and the passthrough openings 124, 125 may comprise a majority of the internal area within the module body 180. According to other embodiments, the floor openings 121, 122, 123 and the passthrough openings 124, 125 may comprise less than a majority of the internal area within the module body 180, such that the work floor 110 covers more of the area within the module body. For example, FIG. 9 shows an alternative embodiment of a module 200 where the work floor 210 covers a majority of the area within the module body 180.

As shown by the upper work area 151 in FIG. 2 and the lower work area 152 in FIG. 3, the upper work area 151 and the lower work area 152 may be mirror images of each other. For example, the splice holder 130 attached to the work floor 110 in the respective upper work area 151 and the lower work area 152 are offset as shown in FIGS. 2 and 3. Alternatively, the splice holder 130 that are respectively attached to the work floor 110 in the upper work area 151 and the lower work area 152 may be stacked on top of each other to cover the same area in the work floor 110, which is enabled by the pattern of attachment slots on the work floor 110 covering both configurations.

As described, the front face plate 101 includes a pattern of adapter openings 127 that includes an upper row of six (6) adapter openings 127, and a lower row of six (6) adapter openings 127, where each adapter opening 127 may be configured to fit a duplex LC adapter. So in this embodiment, the upper row supports up to 12 fibers via the up to six (6) LC duplex adapters, and the lower row supports up to 12 fibers via the up to six (6) LC duplex adapters. These fiber connections at the front face plate 101 may be supplied by, for example, two 12-fiber cables or a single 24-fiber cable coming through the rear opening 106. An exemplary fiber being supplied through the upper route 107 may be secured to the module 100 at the tie-down floor 126 portion using cable ties through the slot openings 116 to secure the fiber, and/or using the retention boss 117 (e.g., screw) to hold down the fiber against the tie-down floor 126 as the retention boss 117 is tightened down. Then the fiber may be routed within the interior of the upper work area 151 to abut against the side walls 103, 104 using the side fiber hold-down tabs 114, abut down against the bridge 111 using the front fiber hold-down tab 113, and abut against the rear wall 105 using the rear hold-down tab 109. These components for holding down and managing the fiber within the upper work area 151 help manage the fiber in an orderly manner. The fiber end may then be routed towards the splice holder 130 and spliced to an existing fiber of a pigtail fiber preinstalled into the splice holder 130, where the plurality (e.g., 12) of preinstalled pigtail fibers are connected to respective adapters installed into one of the adapter openings 127 in the upper row.

In addition or alternatively, instead of being splice to the pigtail fiber preinstalled into the splice holder 130 in the upper work area 151, one or more fibers that come into the upper work area 151 through the upper route 107 may be routed down through the passthrough opening 125, or another opening such as passthrough opening 124 or floor openings 121, 122, 123, to enter the lower work area 152. Once in the lower work area 152, the fiber may be spliced to an existing fiber of a pigtail fiber preinstalled into a splice holder 130 in the lower work area 152 (where the other end of the pigtail fiber is connected to an adapter installed into one of the adapter openings 127 in the lower row), routed out of the module 100 through the lower route 108, or spliced to fibers in the splice holder 130 in the lower work area 152 belonging to another cable that is routed into the lower work area 152 via the lower route 108.

Similarly, an exemplary fiber being supplied through the lower route 108 may be secured to the module 100 at the tie-down floor 126 portion using cable ties through the slot openings 116 to secure the fiber, and/or using the retention boss 117 (e.g., screw) to hold down the fiber against the tie-down floor 126 as the retention boss is tightened down. Then the fiber may be routed within the interior of the lower work area 152 to abut against the side walls 103, 104 using the side fiber hold-down tabs 119, abut down against the bridge 111 using the front fiber hold-down tab 113, and abut against the rear wall 105 using the rear hold-down tab 120. These components for holding down and managing the fiber within the lower work area 152 help manage the fiber in an orderly manner. The fiber end may then be routed towards the splice holder 130 and spliced to an existing fiber of a pigtail fiber preinstalled into the splice holder 130, where the plurality (e.g., 12) of preinstalled pigtail fibers are connected to respective adapters installed into one of the adapter openings 127 in the lower row.

In addition or alternatively, instead of being splice to the pigtail fiber preinstalled into the splice holder 130 in the lower work area 152, one or more fibers that come into the lower work area 152 through the lower route 108 may be routed up through the passthrough opening 124, or another opening such as passthrough opening 125 or floor openings 121, 122, 123, to enter the upper work area 151. Once in the upper work area 151, the fiber may be spliced to an existing fiber of a pigtail fiber preinstalled into a splice holder 130 in the upper work area 151 (where the other end of the pigtail fiber is connected to an adapter installed into one of the adapter openings 127 in the upper row), or routed out of the module 100 through the upper route 107.

Figure 5:
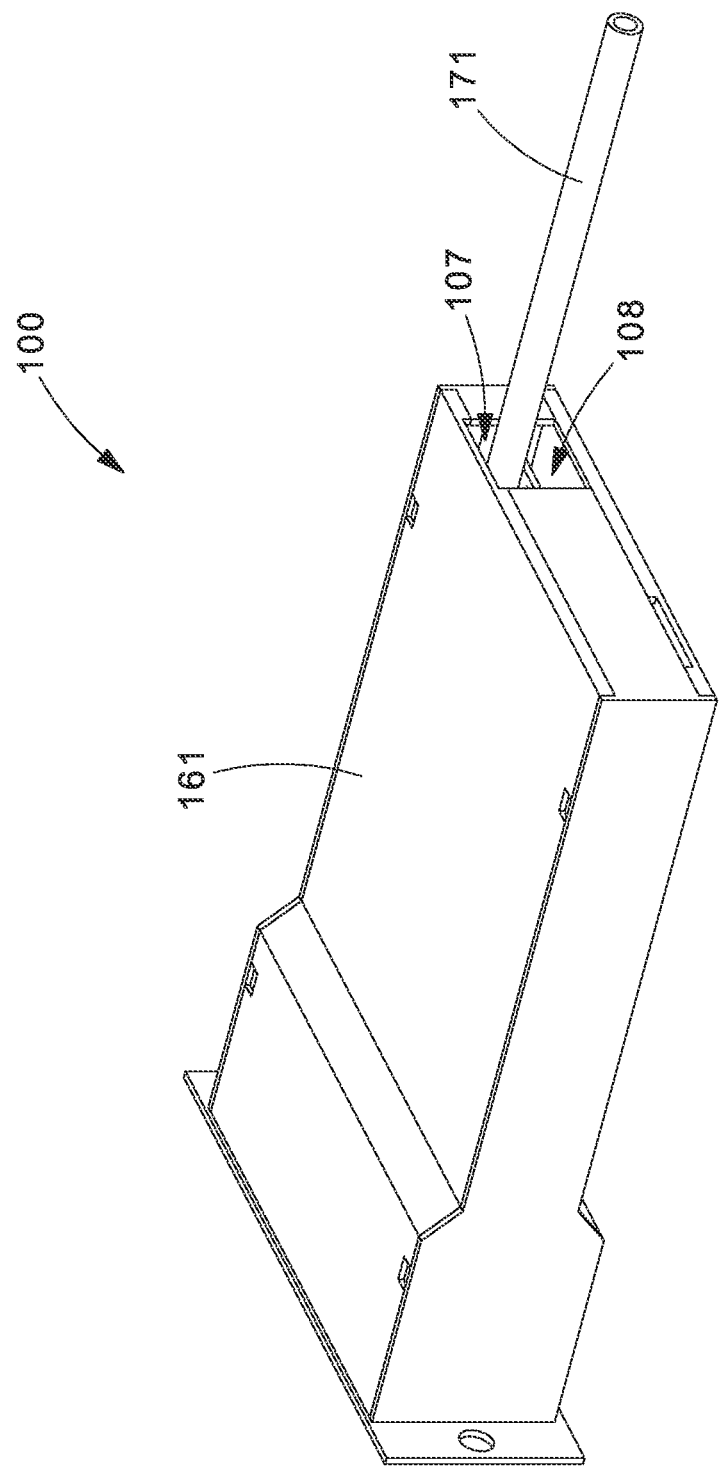
FIG. 5 is a perspective view showing a rear side to the multi-level fiber module shown in FIG. 1, according to a first splicing configuration.

According to the exemplary first splicing configuration shown in FIG. 5, a 24-fiber cable 171 may enter through the upper route 107 of the rear opening 106 to enter the upper work area 151. Then up to twelve (12) fibers from the 24-fiber cable 171 may be managed within the upper work area 151 to, for example, splice with fibers in a pigtail fiber cable that is preinstalled in the splice holder 130 to connect with adapters in the upper row of adapter openings 127 in the front face plate 101. Then, the remaining up to twelve (12) fibers from the 24-fiber cable 171 that have not spliced with the pigtail fiber cable may be routed down to the lower work area 152 according to any of the methods described herein (e.g., via one or more of the openings 121, 122, 123 and/or the passthrough openings 124, 125). In this way, according to the exemplary first splicing configuration shown in FIG. 5 all of the twenty four (24) fibers that enter into the module 100 may be spliced with a preinstalled fiber to be connected to an adapter installed in the front face plate 101. A mirror embodiment may have the 24-fiber cable 171 enter through the lower route 108 and be managed in a mirrored fashion as described.

Figure 6:
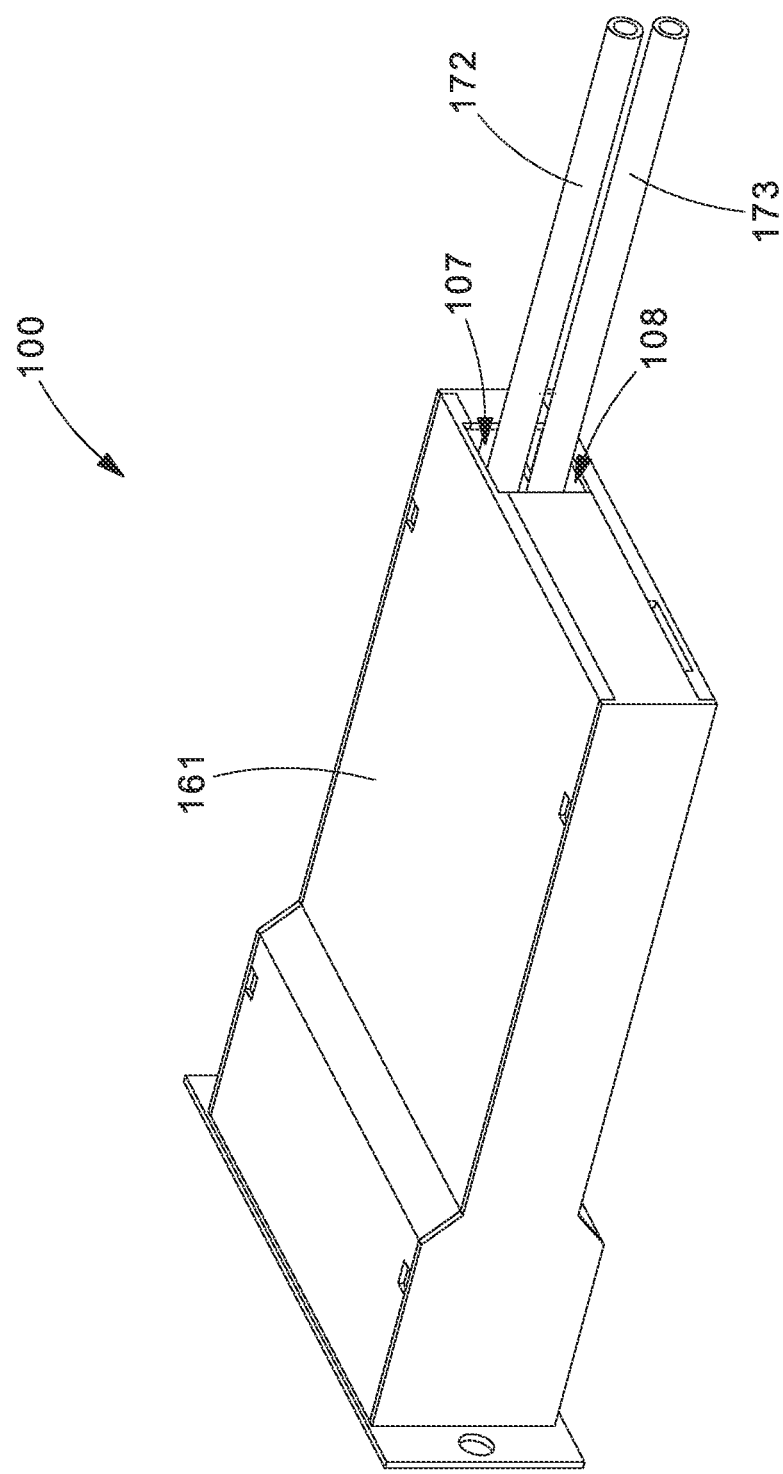
FIG. 6 is a perspective view showing a rear side to the multi-level fiber module shown in FIG. 1, according to a second splicing configuration.

According to the exemplary second splicing configuration shown in FIG. 6, a first 12-fiber cable 172 is shown entering the upper work area 151 via the upper route 107, and a second 12-fiber cable 173 is shown entering the lower work area 152 via the lower route 108. Each of the twelve (12) fibers in the first 12-fiber cable 172 may be managed within the upper work area 151 and eventually spliced with fibers in a pigtail fiber cable that is preinstalled in the splice holder 130 to connect with adapters in the upper row of adapter openings 127 in the front face plate 101. Each of the twelve (12) fibers in the second 12-fiber cable 173 may be managed within the lower work area 152 and eventually spliced with fibers in a pigtail fiber cable that is preinstalled in the splice holder 130 to connect with adapters in the lower row of adapter openings 127 in the front face plate 101.

Figure 7:
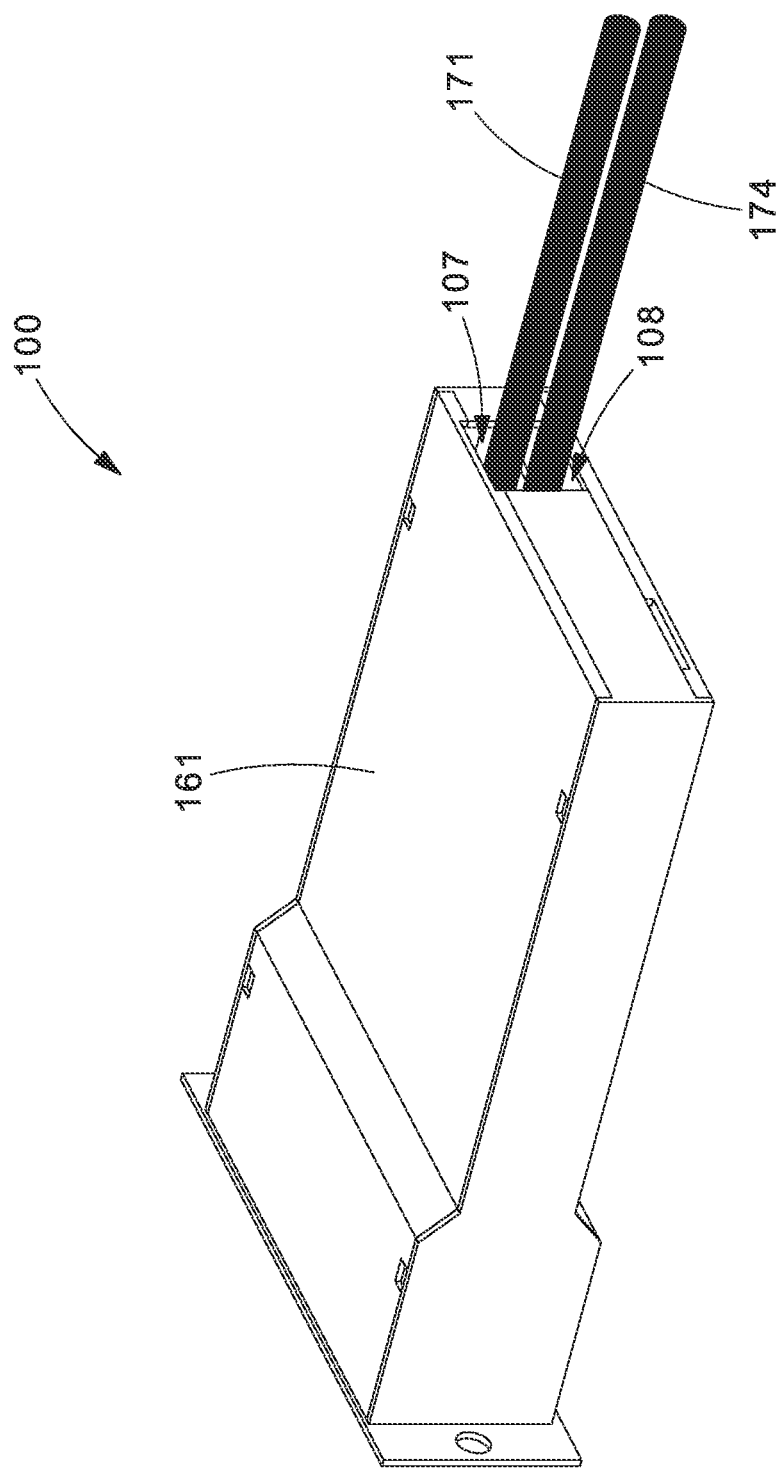
FIG. 7 is a perspective view showing a rear side to the multi-level fiber module shown in FIG. 1, according to a third splicing configuration.

According to the exemplary third splicing configuration shown in FIG. 7, a first 24-fiber cable 171 is shown entering the upper work area 151 via the upper route 107, and a second 24-fiber cable 174 is shown exiting the lower work area 152 via the lower route 108. According to this third splicing configuration, the fibers in the first 24-fiber cable 171 are spliced with the fibers of the second 24-fiber cable 174 within the interior housing of the module body 180. For example, a first set of twelve (12) fibers from the first 24-fiber cable 171 may be spliced with a first set of twelve (12) fibers from the second 24-fiber cable 174 that have been routed up to the upper work area 151 via one or more of the openings 121, 122, 123 and/or the passthrough openings 124, 125, where these first set of splices are held in the splice holder 130 within the upper work area 151. Then a second set of twelve (12) fibers from the first 24-fiber cable 171 may be routed down into the lower work area 152 via one or more of the openings 121, 122, 123 and/or the passthrough openings 124, 125, and spliced with a second set of twelve (12) fibers from the second 24-fiber cable 174, where these second set of splices are held in the splice holder 130 within the lower work area 152.

Other combination of splicing between the first cable and the second cable are within the scope of the module 100 using the cable management features, the splice holders 130, and the passthrough openings 124, 125. Different cables having a different number of fibers is also within the scope of the module 100.

These splicing configurations are provided for exemplary purposes, as other splicing configurations may further be implemented using the module 100.

As mentioned, FIG. 9 shows an alternative embodiment of a module 200 where a work floor 210 covers a majority of the area within the module body 180. The module 200 may be utilized to implement the same splicing and/or fiber management configurations as described for the first embodiment of the module 100.

Many of the components to the module 200 are the same, or substantially similar, to the first embodiment of the module 100. The module includes a front face plate 201, a first side wall 203, a second side wall 204 positioned opposite the first side wall 203, and a rear wall 205 positioned opposite the front face plate 201. The front face plate 201, the first side wall 203, the second side wall 204, the rear wall 205, a top cover (e.g., same as top cover 161), and a bottom cover (e.g., same as bottom cover 162) comprise a module body for the module 200. The front face plate 201 includes a plurality of adapter openings 227 that are arranged in an upper row and a lower row, the same as the front face plate 101 for module 100. The front face plate 201 includes openings 202 at opposite sides for receiving push pins, or other attachment components, to secure the front face plate 201 to a patch panel.

Figure 10:
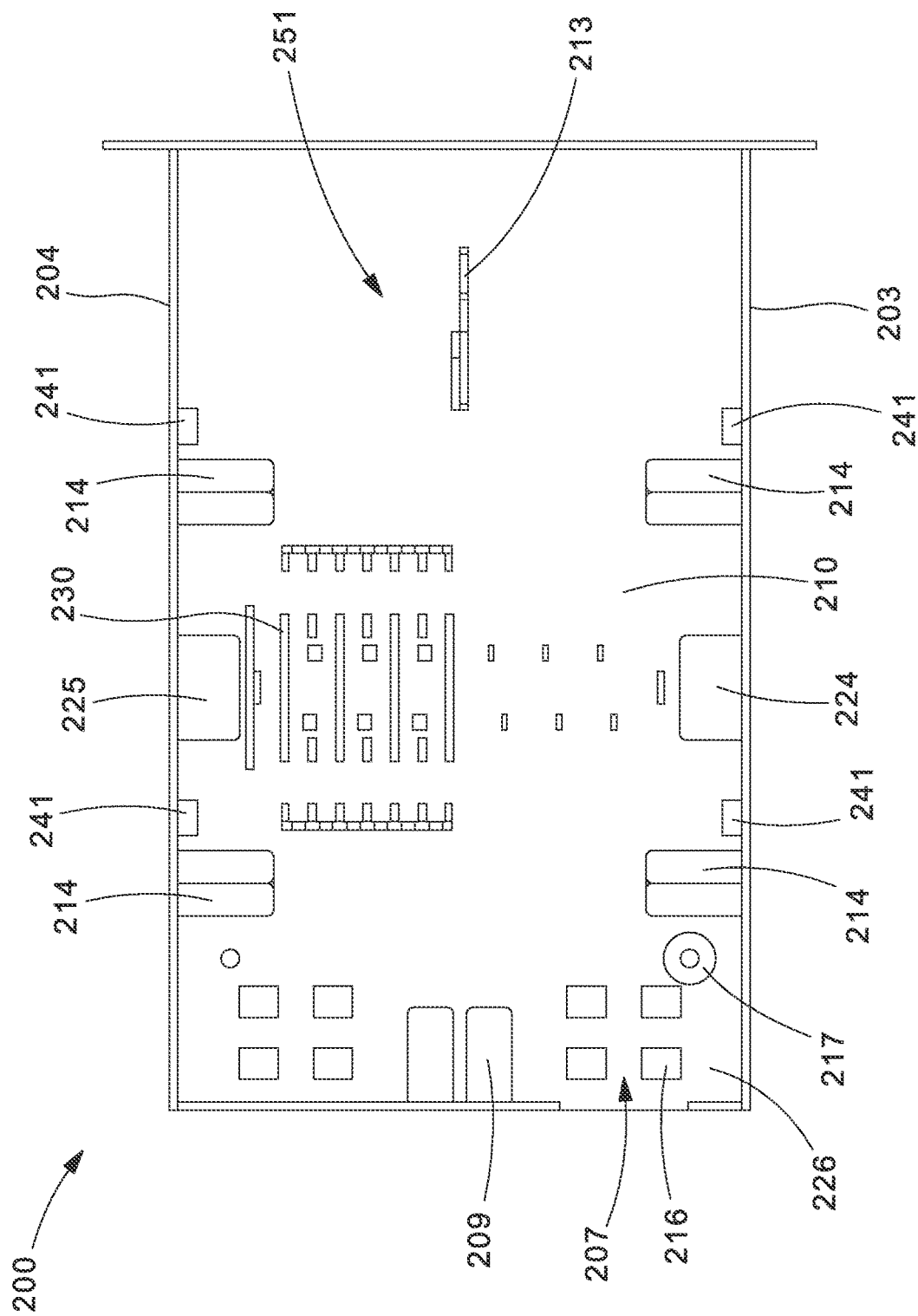
FIG. 10 is a top-down view looking down into a first work area of the multi-level fiber module shown in FIG. 9.
Figure 11:
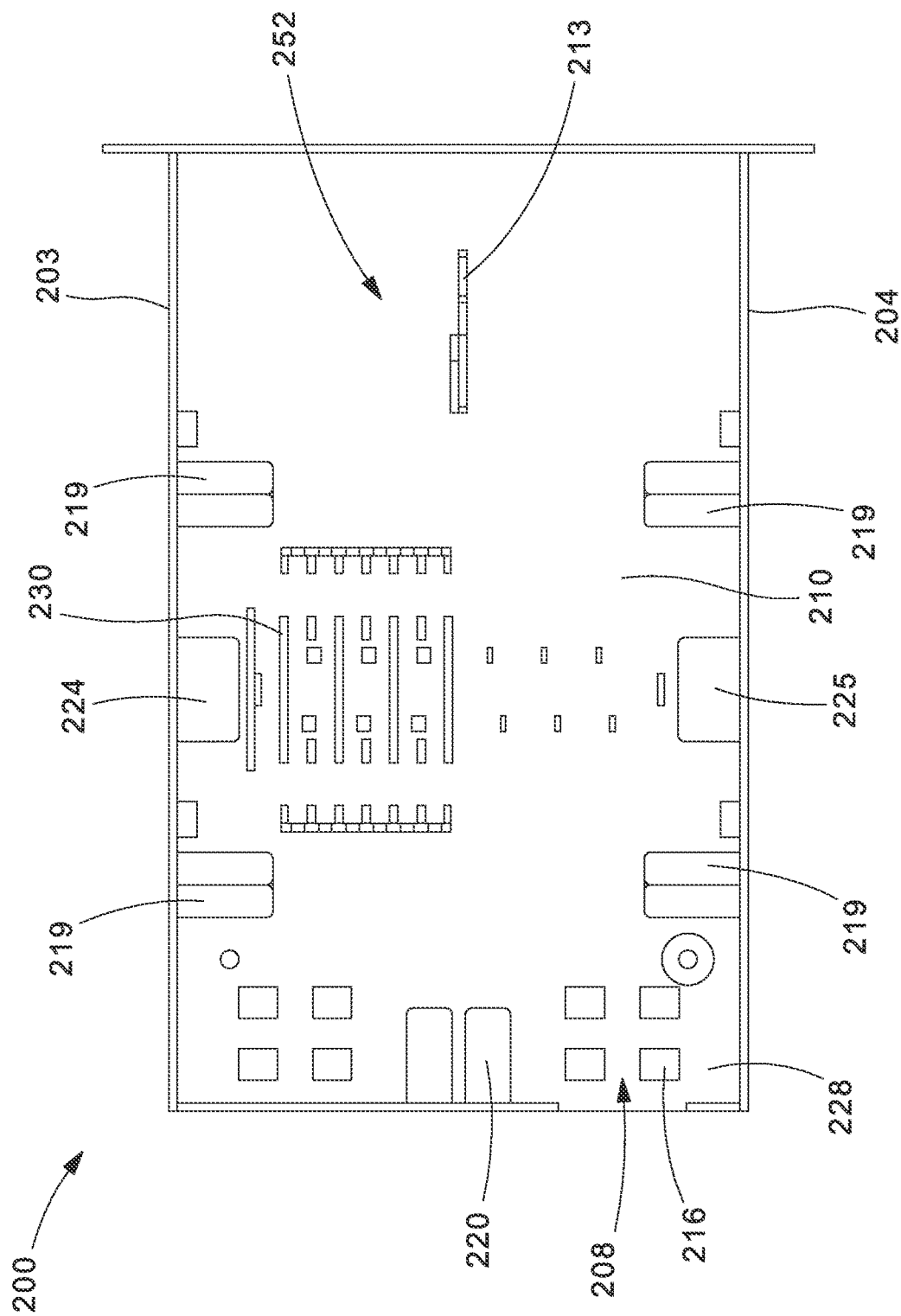
FIG. 11 is a top-down view looking down into a second work area of the multi-level fiber module shown in FIG. 9.

The rear wall 205 includes an upper opening 207 for enabling fiber to enter into and/or exit from an upper work area 251, and a separate lower opening 208 for enabling fiber to enter into and/or exit from a lower work area 252. The upper opening 207 and the lower opening 208 each have their own tie-down floor 226 and 228, as shown in FIGS. 10 and 11 respectively. The tie-down floors 226, 228 include a plurality of slot openings 216 that are spaced and configured so that cable ties may be routed through the slot openings 216 to tie-down fibers that are routed through the upper opening 207 or the lower opening 208. A retention boss 217 is also included near the upper opening 207 and the lower opening 208, where the retention boss 117 is utilized to further secure fibers that are entering or leaving the upper opening 207 and the lower opening 208 to their respective tie-down floors 226 and 228.

The module 200 further includes a top cover (e.g., same as top cover 161) for covering the upper work area 251 and a bottom cover (e.g., same as top cover 161) for covering the lower work area 252. The top cover includes a plurality of notches (e.g., same as notches 163) so that to achieve an assembled state a corresponding tab 241 in the upper portion corresponding to the upper work area 251 of the side walls 203, 204 slide into the notch. Similarly, the bottom cover includes a plurality of notches (e.g., same as notches 163) so that a corresponding tab 241 in the lower portion corresponding to the lower work area 252 of the side walls 203, 204 slide into the notch in the assembled state.

The increased size of the work floor 210 in the module 200 may offer increased structural stability as more of the work floor extends between the opposing side walls 203, 204, and between the front face plate 201 and the rear wall 205. The work floor 210 includes a plurality of attachment slots 218 that are configured to releasably attach a splice holder 230 on each side of the work floor 210 so that a splice holder 230 may be provided in each of the upper work area 251 and the lower work area 252.

As shown in FIG. 10 and FIG. 11, the upper work area 251 and the lower work area 252 are mirrors of each other. The work floor 210 also includes a passthrough opening 224 aligned closer to the splice holder 230 and the second side wall 204 in the upper work area 251, and a passthrough opening 225 aligned closer to the splice holder 230 and the first side wall 203 in the lower work area 252. Both the upper work area 251 and the lower work area 252 include side fiber hold-down tabs 214, 219, a front fiber hold-down tab 213, and a rear fiber hold-down tab 209, 220 for managing fiber within their respective area.

According to an exemplary first splicing configuration for the module 200, a 24-fiber cable may enter through the upper opening 207 in the rear wall 205 to enter the upper work area 251. Then up to twelve (12) fibers from the 24-fiber cable may be managed within the upper work area 251 to, for example, splice with fibers in a pigtail fiber cable that is preinstalled in the splice holder 230 to connect with adapters in the upper row of adapter openings 227 in the front face plate 201. Then, the remaining up to twelve (12) fibers from the 24-fiber cable that have not spliced with the pigtail fiber cable may be routed down to the lower work area 252 through the passthrough opening 225 or 224. In this way, according to the exemplary first splicing configuration for module 200 all of the twenty four (24) fibers that enter into the module 200 may be spliced with a preinstalled fiber to be connected to an adapter installed in the front face plate 201. A mirror embodiment may have the 24-fiber cable enter through the lower opening 208 and be managed in a mirrored fashion as described.

According to an exemplary second splicing configuration for module 200, a first 12-fiber cable may enter the upper work area 251 via the upper opening 207, and a second 12-fiber cable may enter the lower work area 252 via the lower opening 208. Each of the twelve (12) fibers in the first 12-fiber cable may be managed within the upper work area 251 and eventually spliced with fibers in a pigtail fiber cable that is preinstalled in the splice holder 230 to connect with adapters in the upper row of adapter openings 227 in the front face plate 201. Each of the twelve (12) fibers in the second 12-fiber cable may be managed within the lower work area 252 and eventually spliced with fibers in a pigtail fiber cable that is preinstalled in the splice holder 230 to connect with adapters in the lower row of adapter openings 227 in the front face plate 201.

According to an exemplary third splicing configuration for module 200, a first 24-fiber cable may enter the upper work area 251 via the upper opening 207, and a second 24-fiber cable may be exiting the lower work area 252 via the lower opening 208. According to this third splicing configuration, the fibers in the first 24-fiber cable are spliced with the fibers of the second 24-fiber cable within the interior housing of the module body of module 200. For example, a first set of twelve (12) fibers from the first 24-fiber cable may be spliced with a first set of twelve (12) fibers from the second 24-fiber cable that have been routed up to the upper work area 251 from the lower work area 252 via the passthrough openings 224 and/or 225, where these first set of splices are held in the splice holder 230 within the upper work area 251. Then a second set of twelve (12) fibers from the first 24-fiber cable may be routed down into the lower work area 252 via the passthrough openings 224 and/or 225, and spliced with a second set of twelve (12) fibers from the second 24-fiber cable, where these second set of splices are held in the splice holder 230 within the lower work area 252.

Other combination of splicing between the first cable and the second cable are within the scope of the module 200 using the cable management features, the splice holders 230, and the passthrough openings 224, 225. Different cables having a different number of fibers is also within the scope of the module 200.

Furthermore, while the particular embodiments described herein have been shown and described, it will be obvious to those skilled in the art that changes and modifications may be made without departing from the teachings of the multi-work area fiber module described herein. The matter set forth in the foregoing description and accompanying drawings is offered by way of illustration only and not as limitation. The scope of the different embodiments described herein are intended to be defined in the following claims when viewed in their proper perspective.

What is claimed is:

1. A fiber module comprising:
   a module body comprising:
      a first side wall;
      a second side wall;
      a rear wall including a rear opening, the rear opening including an upper route and a lower route;
      a top cover;
      a bottom cover; and
      a front face plate comprising a plurality of adapter openings, the plurality of adapter openings being arranged in at least a first row and a second row;
   a work floor extending between the first side wall to the second side wall, the work floor defining, at least in part, bounds of a first work area and a second work area within an interior of the module body, wherein the work floor includes at least one opening that provides access between the first work area and the second work area;
   a first splice holder attached to a first side of the work floor and included within the first work area;
   a second splice holder attached to a second side of the work floor and included within the second work area;
   wherein the at least one opening includes a first front-side opening positioned between the front face plate and the first splice holder, and a second front-side opening positioned behind the front face plate and next to the first front-side opening; and
   wherein the work floor further includes a hold-down tab positioned between the first front-side opening and the second front-side opening.

2. The fiber module of claim 1, wherein an interior volume of the first work area is equal to an interior volume of the second work area.

3. The fiber module of claim 1, wherein an interior volume of the first work area is different from an interior volume of the second work area.

4. The fiber module of claim 1, wherein the at least one opening further includes a passthrough opening near the first splice holder.

5. The fiber module of claim 1, wherein a total area of the at least one opening is greater than a total area of the work floor.

6. The fiber module of claim 1, wherein the first work area includes a first set of tabs attached to the first side wall, the second side wall, and the rear wall for managing slack fiber inside the first work area.

7. The fiber module of claim 1, wherein the first route leads into the first work area and the second route leads into the second work area.

8. The fiber module of claim 7, wherein the first route is configured to receive a first cable into the first work area, wherein the first cable includes fibers configured to splice with pigtail fibers preinstalled into a splice holder included within the first work area.

9. The fiber module of claim 7, wherein the second route is configured to receive a second cable into the second work area, wherein the second cable includes fibers configured to splice with pigtail fibers preinstalled into a splice holder included within the second work area.

10. The fiber module of claim 7, wherein the first route is configured to receive a third cable into the first work area, wherein a first fiber included in the third cable is configured to splice with a pigtail fiber preinstalled into a splice holder included within the first work area, and wherein a second fiber included in the third cable is routed down to the second work area where the second fiber is configured to splice with a pigtail fiber preinstalled into a splice holder included within the second work area.

11. The fiber module of claim 7, wherein the first route is configured to receive a fourth cable into the first work area and receive a fifth cable into the second work area, wherein a first fiber included in the fourth cable is configured to splice with a first fiber included in the fifth cable within the first work area, and wherein a second fiber included in the fourth cable is configured to splice with a second fiber included in the fifth cable within the second work area.

12. A fiber module comprising:
   a module body comprising:
      a first side wall;
      a second side wall;
      a rear wall including a first rear opening and a second rear opening;
      a top cover;
      a bottom cover; and
      a front face plate comprising a plurality of adapter openings, the plurality of adapter openings being arranged in at least a first row and a second row;
   a work floor extending between the first side wall to the second side wall, the work floor defining, at least in part, bounds of a first work area and a second work area within an interior of the module body, wherein the work floor includes at least one opening that provides access between the first work area and the second work area;

a first splice holder attached to a first side of the work floor and included within the first work area;

a second splice holder attached to a second side of the work floor and included within the second work area;

wherein the at least one opening includes a first front-side opening positioned between the front face plate and the first splice holder, and a second front-side opening positioned behind the front face plate and next to the first front-side opening; and wherein the work floor further includes a hold-down tab positioned between the first front-side opening and the second front-side opening.

13. The fiber module of claim 12, wherein an interior volume of the first work area is equal to an interior volume of the second work area.

14. The fiber module of claim 12, wherein an interior volume of the first work area is different from an interior volume of the second work area.

15. The fiber module of claim 12, wherein the work floor includes at least one passthrough opening that provides access between the first work area and the second work area.

16. The fiber module of claim 12, wherein the first rear opening is configured to receive a first cable into the first work area, and the second rear opening is configured to receive a second cable into the second work area.

17. The fiber module of claim 12, wherein the first rear opening is configured to receive a third cable into the first work area, wherein a first fiber included in the third cable is configured to splice with a pigtail fiber preinstalled into a splice holder included within the first work area, and wherein a second fiber included in the third cable is routed down to the second work area through a passthrough opening included in the work floor, and wherein the second fiber is configured to splice with a fiber included in a fourth cable within the second work area.

* * * * *